(12) United States Patent
Park

(10) Patent No.: US 8,766,923 B2
(45) Date of Patent: Jul. 1, 2014

(54) APPARATUS AND METHOD FOR INPUTTING CHARACTERS IN A TERMINAL

(71) Applicant: Samsung Electronics Co., Ltd., Gyeonggi-do (KR)

(72) Inventor: Se-Hwan Park, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/939,576

(22) Filed: Jul. 11, 2013

(65) Prior Publication Data

US 2013/0293479 A1    Nov. 7, 2013

Related U.S. Application Data

(63) Continuation of application No. 12/410,995, filed on Mar. 25, 2009, now Pat. No. 8,508,483.

(30) Foreign Application Priority Data

Mar. 28, 2008  (KR) ........................ 10-2008-0029072

(51) Int. Cl.
- *G06F 3/023* (2006.01)
- *G06F 3/041* (2006.01)
- *G06F 3/02* (2006.01)

(52) U.S. Cl.
USPC ............ 345/171; 345/160; 345/168; 715/703

(58) Field of Classification Search
USPC .......... 715/700, 703; 345/169, 171–178, 156, 345/160, 168
See application file for complete search history.

(56) References Cited

U.S. PATENT DOCUMENTS

| | | | |
|---|---|---|---|
| 6,822,585 B1 | 11/2004 | Ni et al. | |
| 7,095,403 B2 * | 8/2006 | Lyustin et al. | ................. 345/171 |
| 7,098,896 B2 * | 8/2006 | Kushler et al. | ................. 345/168 |
| 7,197,184 B2 | 3/2007 | Repka | |
| 7,336,206 B2 * | 2/2008 | Sugimura et al. | ............... 341/22 |
| 2004/0252035 A1 | 12/2004 | Chang | |

FOREIGN PATENT DOCUMENTS

| | | |
|---|---|---|
| JP | 11096141 | 4/1999 |
| KR | 1020010067181 | 7/2001 |
| KR | 1020040091837 | 11/2004 |

* cited by examiner

*Primary Examiner* — Andrew Sasinowski
(74) *Attorney, Agent, or Firm* — The Farrell Law Firm, P.C.

(57) ABSTRACT

A character input apparatus and method in a terminal are provided, in which a touch screen displays a first key set and a second key set. The first key set includes first letter keys with all consonants and a second letter key with symbols indicating Tone Marks (Tms) and positions of predetermined vowels, for inputting all vowels and Tms. The second key set includes the predetermined vowels or Tms. Upon selection of a symbol by the second letter key, the controller controls the touch screen to display the second key set and receives at least one letter by the first key set and the second key set.

12 Claims, 17 Drawing Sheets

APPARATUS AND METHOD FOR INPUTTING CHARACTERS IN A TERMINAL

PRIORITY

The present application is a Continuation of U.S. application Ser. No. 12/410,995, which was filed in the United States Patent and Trademark Office on Mar. 25, 2009, and claims priority under 35 U.S.C. §119(e) to Korean Patent Application filed in the Korean Intellectual Property Office on Mar. 28, 2008 and assigned Serial No. 10-2008-0029072, the entire disclosure of which is incorporated herein by reference.

BACKGROUND OF THE INVENTION

1. Field of the Invention

The embodiments of the present invention relate generally to an apparatus and method for inputting characters in a terminal. More particularly, to an apparatus and method for inputting Thai characters on a touch screen of a terminal.

2. Description of the Related Art

Personal terminals, i.e., small-size terminals that users carry with them, include, for example, Personal Data Assistants (PDAs), wireless communication terminals, Moving Picture Experts Group (MPEG)-1 Audio Layer 3 (MP3) players, Bluetooth devices, and digital cameras. A PDA will be used as an example herein.

A PDA typically has the core of a computer, i.e. a Central Processing Unit (CPU), a memory, an Operating System (OS), OS-based software programs, and peripheral devices. PDAs can carry out the functions of information collection, storage, editing, and search. The PDA has also developed into a composite device equipped with a portable phone module, for voice communications and data communications (including over the Internet) in recent years.

PDAs usually include a touch screen. The touch screen is composed of a display such as a Liquid Crystal Display (LCD) and a touch panel mounted on the display. A user invokes an intended application by touching an icon displayed on the touch screen or enters characters by touching a touch screen keyboard displayed in a predetermined area of the touch screen, with his finger or a pointer.

FIG. 1A illustrates a conventional keyboard layout for inputting Thai characters on a touch screen keyboard of a terminal.

Referring to FIG. 1A, the touch screen of the terminal includes a touch screen keyboard area 110 with keys for inputting characters and a display area 130 for displaying a character corresponding to a key entered through the touch screen keyboard area 110. For example, a keyboard layout designed for a Personal Computer (PC) also applies to the touch screen keyboard area 110.

FIG. 1B illustrates a conventional 3×4 layout for inputting Thai characters on a touch screen keyboard of a terminal.

Referring to FIG. 1B, 5 to 17 Thai letters are mapped to each key in the 3×4 layout for inputting Thai characters. With the 3×4 layout, a user enters an intended character by repeatedly pressing a key corresponding to the character and thus rotating letters mapped to the key.

In case of the keyboard layout of FIG. 1A, the touch screen keyboard of the touch screen must be scaled down, due to a limited size of the touch screen. The resulting decrease in key size on the touch screen keyboard makes it inconvenient for users to view and touch keys. Thus, character entry is difficult. The 3×4 layout of FIG. 1B has another shortcoming in that a character input speed is reduced, because the same key must be repeatedly pressed a maximum of 20 times in order to enter one Thai letter.

Accordingly, there exists a need for a method for facilitating Thai character entry on a touch screen in a terminal.

SUMMARY OF THE INVENTION

The present invention has been designed to address at least the problems and/or disadvantages and to provide at least the advantages described below. Accordingly, an aspect of the embodiments of the present invention is to provide an apparatus and method for inputting Thai characters through a touch screen that facilitates Thai character entry in a terminal.

Another aspect of the embodiments of the present invention provides an apparatus and method for inputting Thai characters through a touch screen that displays Thai letters in groups in a terminal.

A further aspect of the embodiments of the present invention provides an apparatus and method for inputting Thai characters using a pop-up screen in a terminal.

In accordance with an aspect of the embodiments of the present invention, a character input apparatus of a terminal is provided. The apparatus includes a touch screen for displaying a first key set and a second key set, the first key set including first letter keys for inputting consonants, and a second letter key corresponding to symbols indicating Tone Marks (Tms) and positions of predetermined vowels, for inputting the predetermined vowels and the Tms, wherein the second key set includes all of the predetermined vowels or Tms, and a controller for, upon a selection of a symbol through the second letter key, controlling the touch screen to display the second key set and receiving an input of at least one letter through the first key set and the second key set.

In accordance with another exemplary embodiment of the present invention, a character input method of a terminal is provided. The method includes displaying a first key set on a touch screen, the first key set including first letter keys for inputting consonants, and a second letter key with symbols indicating Tms and positions of predetermined vowels, wherein the second letter key is for inputting all of the predetermined vowels and the Tms, displaying, upon an input of a letter through one of the first letter keys, the letter on the touch screen, displaying, upon selection of a symbol by the second letter key, a second key set including the predetermined vowels or Tms, and receiving an input of at least one letter through the second key set.

In accordance with another aspect of the embodiments of the present invention, a character input apparatus of a terminal is provided. The apparatus includes a touch screen for displaying a first key set and a second key set, the first key set including a plurality of square first letter keys that have predetermined consonants and a plurality of square second letter keys that have symbols indicating positions of predetermined vowels and Tms, and the second key set including a plurality of square third letter keys to which at least one vowel or Tm related to a symbol corresponding to a second letter key selected from the first key set, and a controller for, upon selection of a first letter key from among the plurality of square first letter keys and the second letter key in the first key set, controlling the touch screen to display the second key set and receiving an input of at least one letter through the second key set.

In the second key set, each of the third letter keys may be displayed as a same size as the second letter key.

In the second key set, the third letter keys may be displayed surrounding the second letter key at a center.

The touch screen may include a touch keyboard at a lower portion of the touch screen, for displaying the first key set and a display at an upper portion of the touch screen, for displaying a letter input through the touch keyboard, and a part of the second key set may be displayed on the display.

A letter allocated to a third letter key positioned in a touch input direction on the touch screen may be displayed on the display.

The second key set may be displayed at a larger size than the second letter key, not to cover other letter keys adjacent to the second letter key.

The second key set may be highlighted while being displayed.

In accordance with a further aspect of the embodiments of the present invention, a character input method of a terminal is provided. The method includes displaying a first key set on a touch screen, the first key set including a plurality of square first letter keys that have predetermined consonants and a plurality of square second letter keys that have symbols indicating positions of predetermined vowels and Tms, receiving inputs of a first letter key from among the plurality of square first letter keys and a second letter key, through the first key set, displaying a second key set including a plurality of square third letter keys to which at least one vowel or Tms related to a symbol corresponding to the selected second letter key, and receiving an input of at least one of the third letter keys through the second key set.

Each of the third letter keys may be displayed as a same size as the second letter key in the second key set.

An input of a letter allocated to a third letter key positioned in a touch input direction on the touch screen may be received.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS

The matters defined in the description such as a detailed construction and specific elements, are provided to assist in a comprehensive understanding of the embodiments of the invention. Accordingly, those of ordinary skill in the art will recognize that various changes and modifications of the embodiments described herein can be made without departing from the scope and spirit of the present invention. Also, descriptions of well-known functions and constructions are omitted for clarity and conciseness.

The embodiments of the present invention are directed to inputting Thai characters on a touch screen that facilitates Thai character entry. For inputting Thai characters, a minimum number of group keys are displayed on the touch screen. When a consonant group key and then a vowel or Tm group key are selected from the group keys, a user-desired group of vowels or Tms is displayed over the vowel or Tm group key.

In accordance with the present invention, key selection and character input involves a key press and release, or a key press, drag, and release. The consonants, vowels, and Tms of the Thai alphabet are defined as "letters" and consonant keys and vowel or Tm keys are defined as "letter keys".

While the present invention will be described in the context of a touch screen having consonant keys, or vowel or Tm keys, the keys arrayed in the touch screen can be changed according to the use frequency or purposes of the keys, and other key layouts can also be adopted.

According to an embodiment of the present invention, all consonants of the Thai alphabet are grouped into predetermined first groups and all vowels and Tms of the Thai alphabet are grouped into predetermined second groups (symbols) indicating Tms and the positions of vowels.

The touch screen displays, in a touch screen keyboard area, an initial screen having at least first group keys as first letter keys corresponding to the first groups and a second group key as a second letter key including the second groups and, when one second group is selected from the second group key on the initial screen, the touch screen displays a pop-up screen with the letters of the selected second group over the second group key.

Figures 1A, 1B:
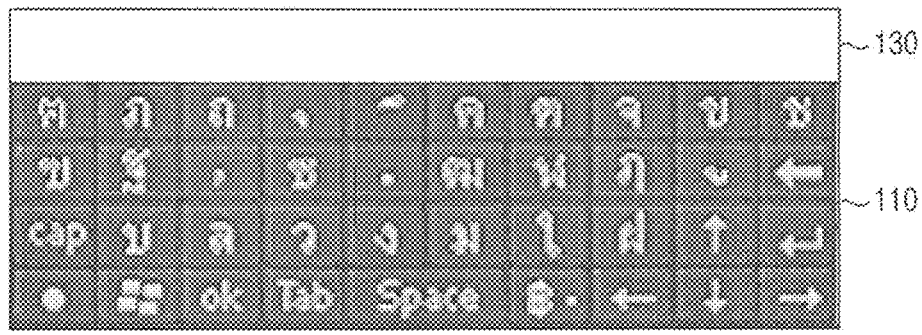
FIG. 1A illustrates a conventional keyboard layout for inputting Thai letters on a touch screen keyboard of a terminal.
FIG. 1B illustrates a conventional 3×4 layout for inputting Thai characters on a touch screen keyboard of a terminal.
Figures 2, 3:
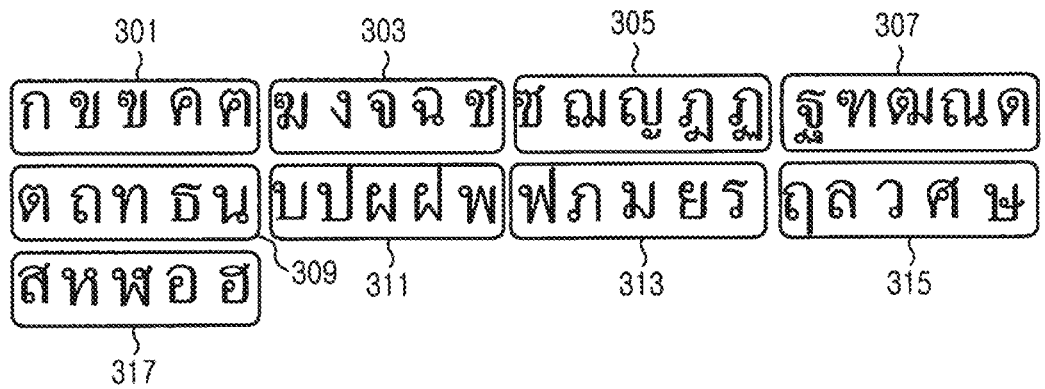
FIG. 2 illustrates the Thai alphabet to which the present invention is applied.
FIG. 3 illustrates a Thai consonant grouping method according to an embodiment of the present invention.

FIG. 2 illustrates the Thai alphabet to which the present invention is applied.

Referring to FIG. 2, the Thai alphabet includes 45 consonants 210, 18 vowels 230, and four Tms 250. The Thai alphabet further includes obsolete letters 270.

Figure 4A:
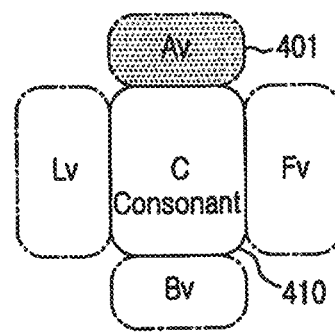
FIGS. 4A to 4E illustrate a Thai vowel and Tone Mark (Tm) grouping method according to an embodiment of the present invention.
Figure 4B:
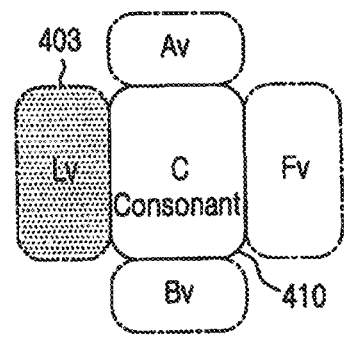
Figure 4C:
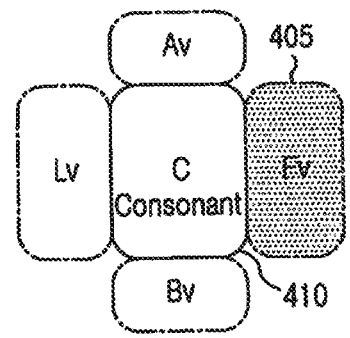
Figure 4D:
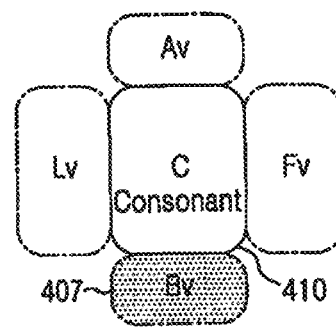
Figure 4E:
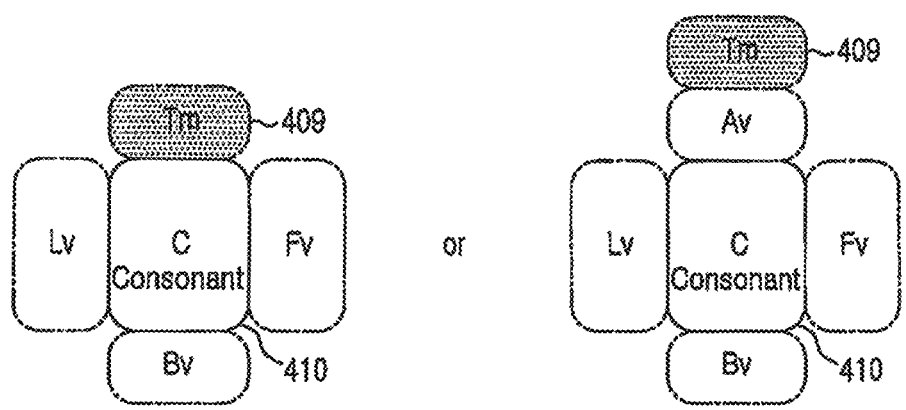

The Thai letters illustrated in FIG. 2 are grouped as illustrated in FIG. 3 to FIG. 4E according to an embodiment of the present invention.

FIG. 3 illustrates a Thai consonant grouping method according to an embodiment of the present invention.

Referring to FIG. 3, the 45 Thai consonants are sequentially grouped into nine first groups 301 to 317, each having five letters in compliance with TIS 620-2533. Each of the five letters of each group is positioned above, below, at the left of, at the right of, or at the center of a predetermined group key.

FIGS. 4A to 4E illustrate a Thai vowel and Tm grouping method according to an embodiment of the present invention.

Referring to FIGS. 4A to 4E, the 18 Thai vowels are grouped into second groups according to their positions with respect to consonants.

To be specific, the second groups are an Above Vowels (Av) group 401 with seven vowels above a consonant 410 ◌̆, ◌̂, ◌̃, ◌̊, ◌ͬ, ◌ͤ, ◌ͫ) illustrated in FIG. 4A, a Leading Vowels (Lv) group 403 with five vowels at the left of the consonant 410 (เ, แ, โ, ใ, ไ) illustrated in FIG. 4B, a Following Vowels (Fv) group 405 with three vowels at the right of the consonant 410 (ะ, า, ํา) illustrated in FIG. 4C, a Below Vowels (Bv) group 407 with two vowels below the consonant 410 (◌ุ, ◌ู) illustrated in FIG. 4D, and a Tm group 409 with four Tms above the consonant 410 or above the Av group 401 (◌่, ◌้, ◌๊, ◌๋) illustrated in FIG. 4E.

The first and second groups are set according to user convenience and thus the grouping criterion may vary with manufacturers. The obsolete letters can be included in one of the first and second groups.

In the touch screen, the first group keys and the second group key displayed in the initial screen of the touch screen keyboard area are referred to as "a first key set" and keys for the letters of a group selected from the second groups by the second group key are referred to as "a second key set". The keys of the first and second key sets are of predetermined sizes. For example, each key of the second key set is of a size large enough to allow selection of any key of the first key set, without inconvenience, while the key of the second key set is displayed. Each key of the second key set is of a size that does not cause inconvenience in selecting the key. For example, the second key set can be overlaid on a key selected by the first key set and have a size slightly greater than or equal to the area of the selected key. In another example, the first and second key sets are of the same size or of a similar size.

Figure 5A:
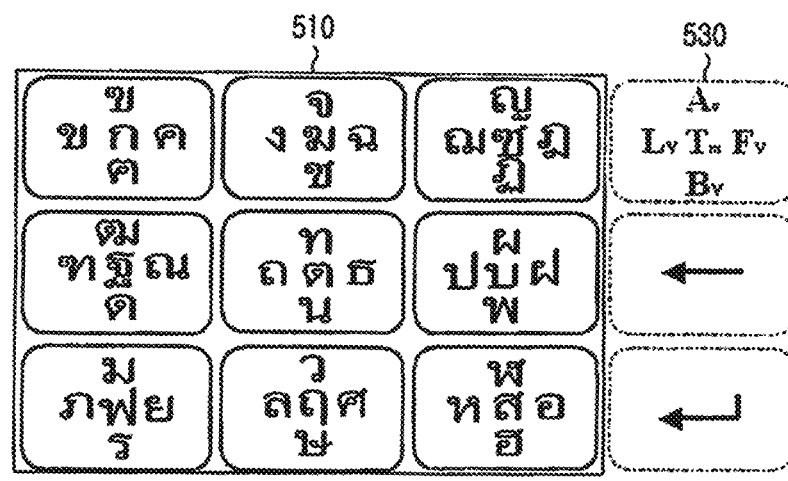
FIGS. 5A and 5B illustrate a touch screen designed for inputting Thai characters according to an embodiment of the present invention.
Figure 5B:
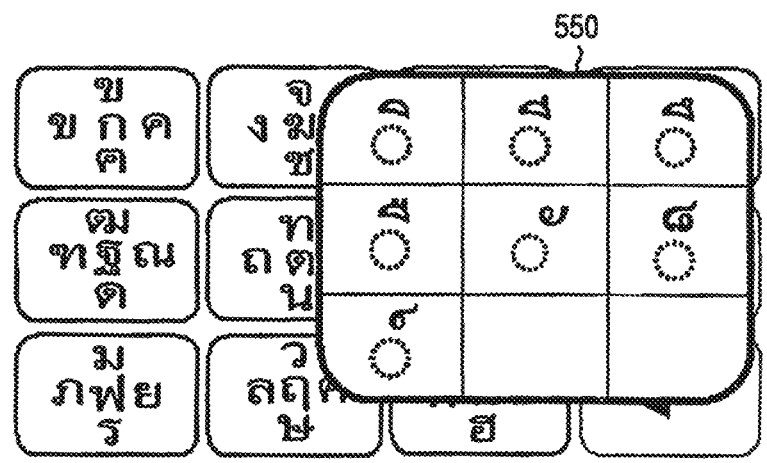

FIGS. 5A and 5B illustrate a touch screen designed for Thai character input according to an embodiment of the present invention.

Referring to FIG. 5A, the first key set includes nine first group keys 510 and a second group key 530. The letters of each group are positioned respectively at the center, above, below, at the left, at the right of the group in the first group keys 510. Tm is positioned at the center and Av, Bv, Lv and Fv are positioned above, below, at the left, and at the right, respectively in the second group key 530 in order to allow selection of one of the second groups for input of a vowel or Tm according to its position with respect to a consonant.

Referring to FIG. 5B, a second key set 550 includes the letters of a second group selected by the second group key 530 (e.g. the letters of the Av group).

Figure 6:
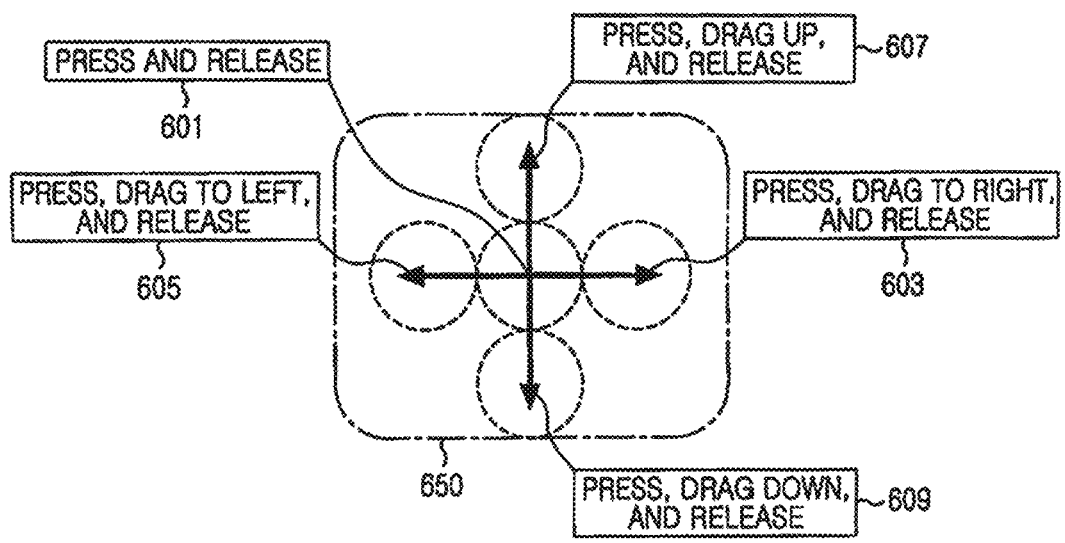
FIG. 6 illustrates a method for inputting an intended letter using a first key set of the touch screen according to an embodiment of the present invention.
Figure 7A:
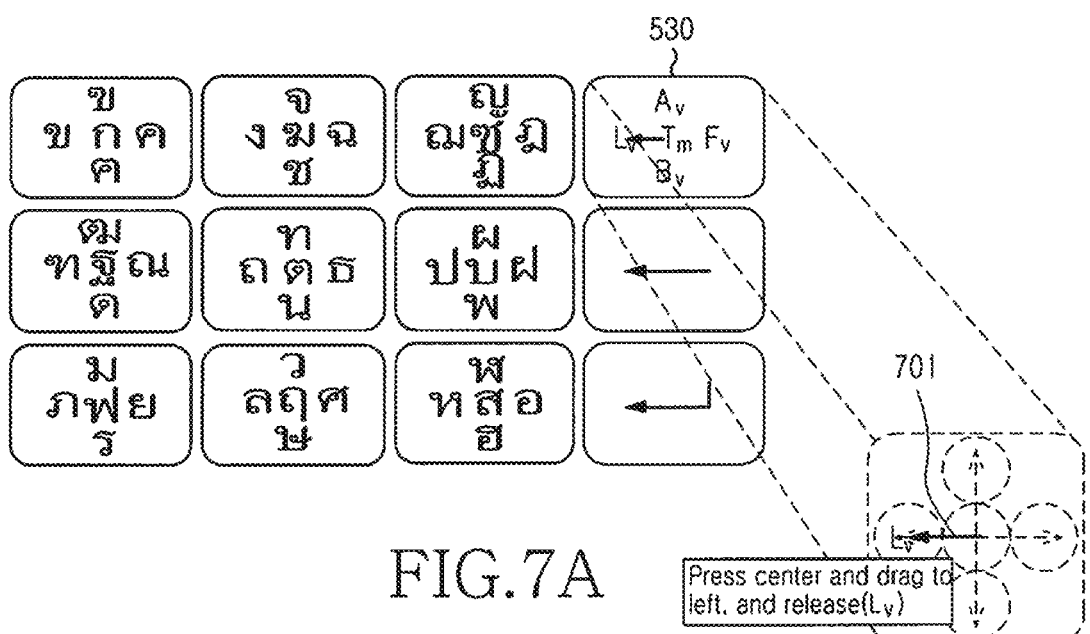
FIGS. 7A to 7J illustrate a method for inputting an intended letter using a second key set of the touch screen according to an embodiment of the present invention.
Figure 7B:
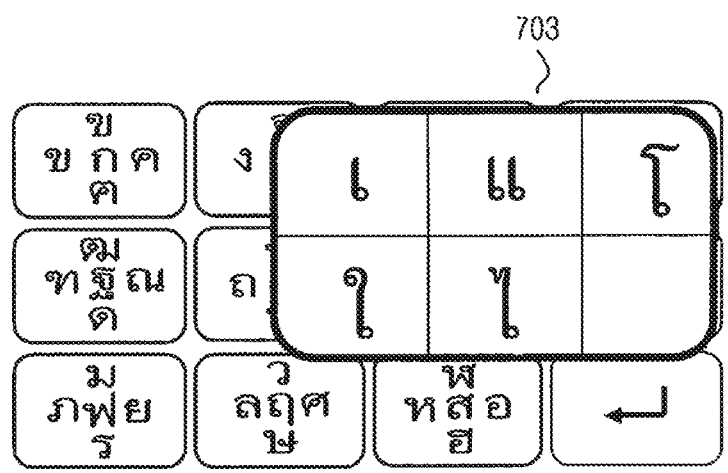
Figure 7C:
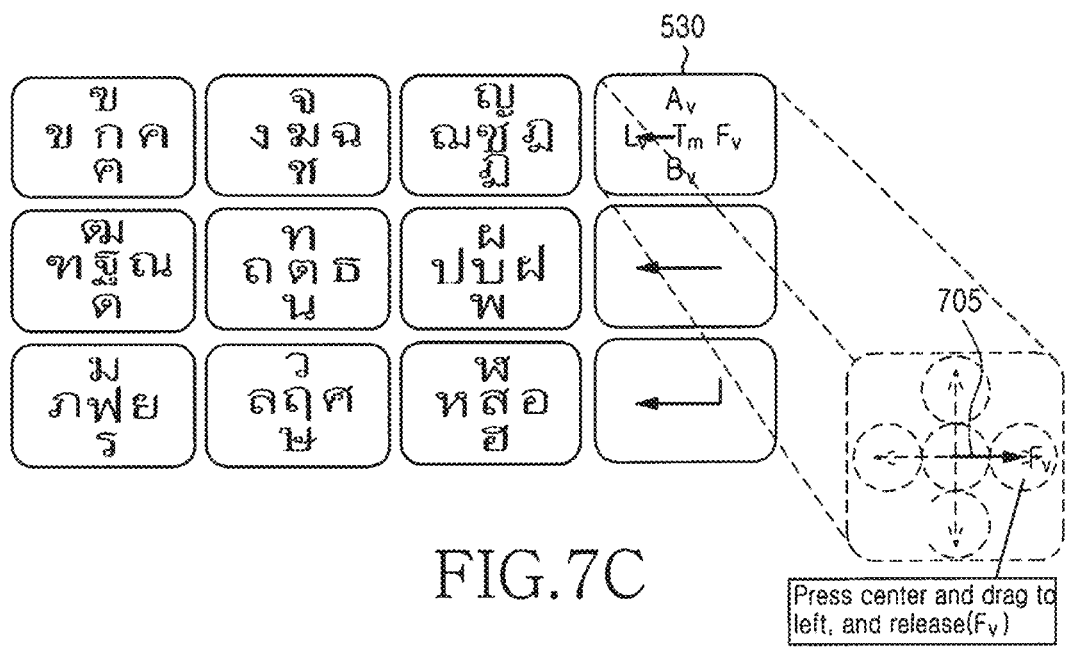
Figure 7D:
Figure 7E:
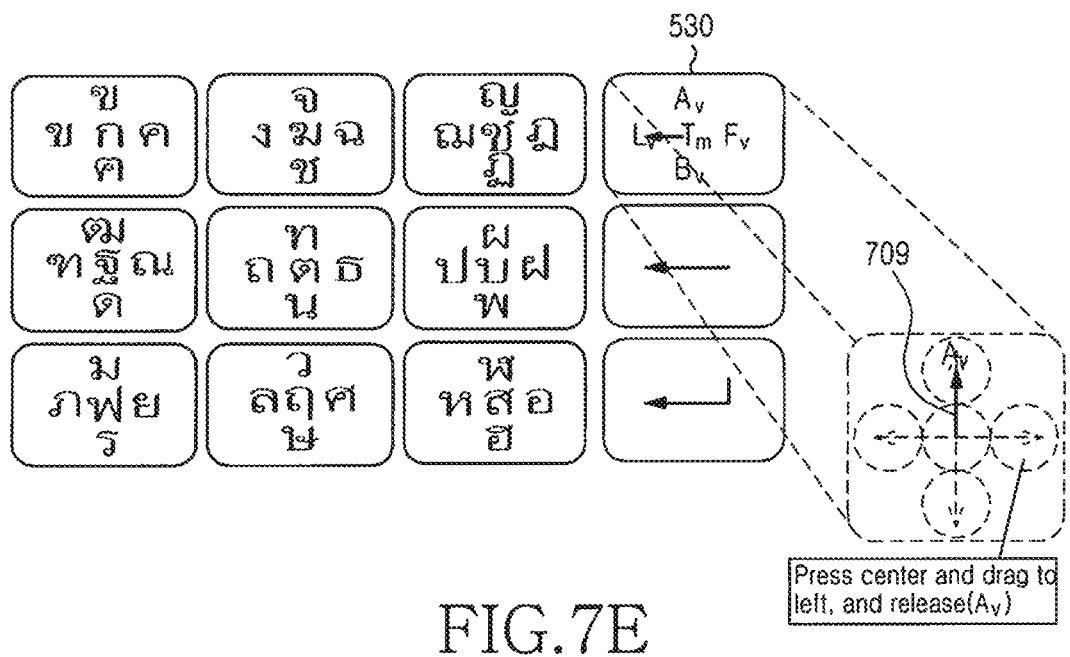

Referring to FIGS. 6 to 7E, a method for inputting user-intended characters using the first group keys or the second group key of the first key set on the touch screen will be described as follows.

FIG. 6 illustrates a method for inputting an intended letter using the first key set of the touch screen according to an embodiment of the present invention.

Referring to FIG. 6, when a user wants to enter a letter at the center of a key using a first group key 650 among the first group keys of the first key set, the user presses and releases the first group key 650 as indicated by reference numeral 601. In order to enter a letter at the right of the first group key 650, the user presses the first group key 650, drags to the right, and releases with a pointer, as indicated by reference numeral 603. In order to enter a letter above, below, or at the left of the first group key 650, the user presses the first group key 650, drags upward, downward, or to the left, and releases with the pointer in the same manner for input of the right letter, as indicated by reference numeral 605, 607 or 609.

FIGS. 7A to 7J illustrate a method for inputting an intended letter using a second key set of the touch screen according to an exemplary embodiment of the present invention.

Referring to FIGS. 7A and 7B, in order to enter a letter of the Lv group using the second group key 530 of the first key set, the user presses the second group key 530, drags, and releases to the left as indicated by reference numeral 701. Thus, a second key set 703 is displayed so that the user can enter the letter of the Lv group.

Referring to FIGS. 7C and 7D, in order to enter a letter of the Fv group using the second group key 530 of the first key set, the user presses the second group key 530, drags to the right, and releases as indicated by reference numeral 705. Thus, a second key set 707 is displayed so that the user can enter the letter of the Fv group.

Figure 7F:
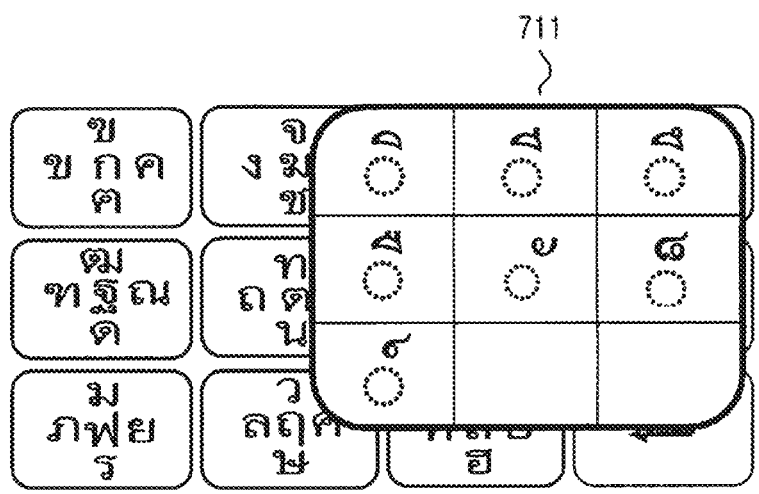

Referring to FIGS. 7E and 7F, in order to enter a letter of the Av group using the second group key 530 of the first key set, the user presses the second group key 530, drags upward, and releases as indicated by reference numeral 709. Thus, a second key set 711 is displayed so that the user can enter the letter of the Av group.

Figure 7G:
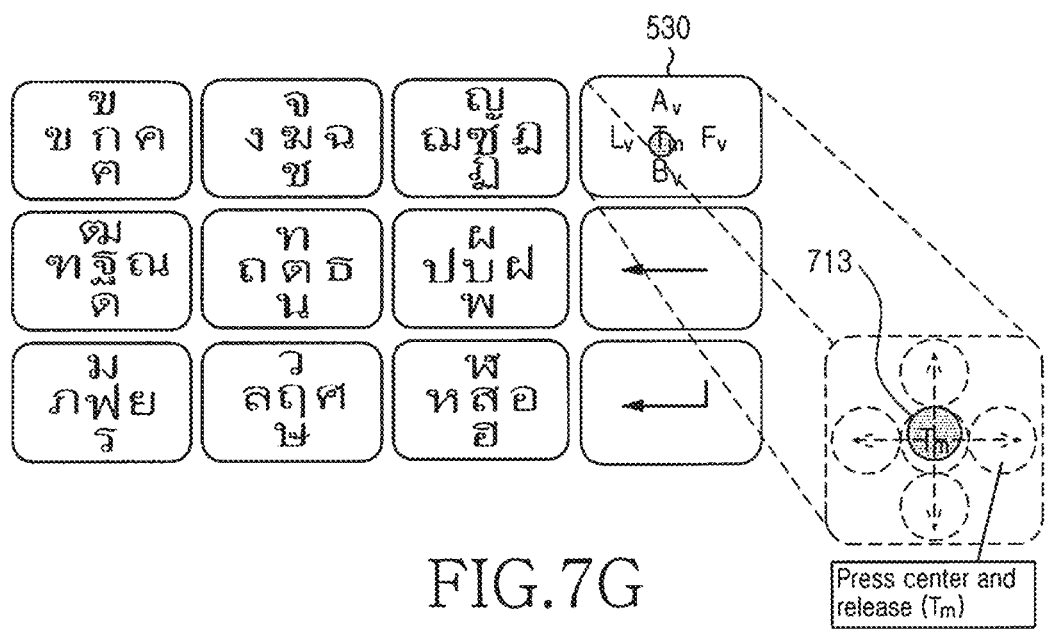
Figure 7H:
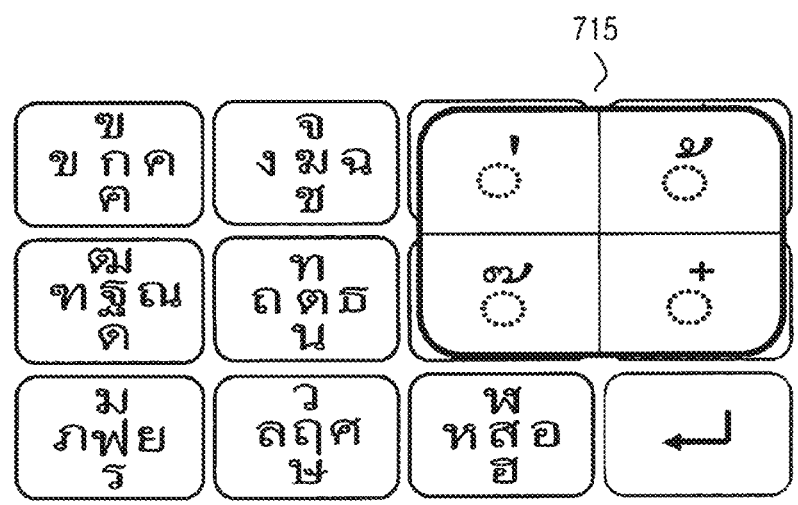

Referring to FIGS. 7G and 7H, in order to enter a letter of the Tm group using the second group key 530 of the first key set, the user presses the second group key 530 and releases as indicated by reference numeral 713. Thus, a second key set 715 is displayed so that the user can enter the letter of the Tm group.

Figure 7I:
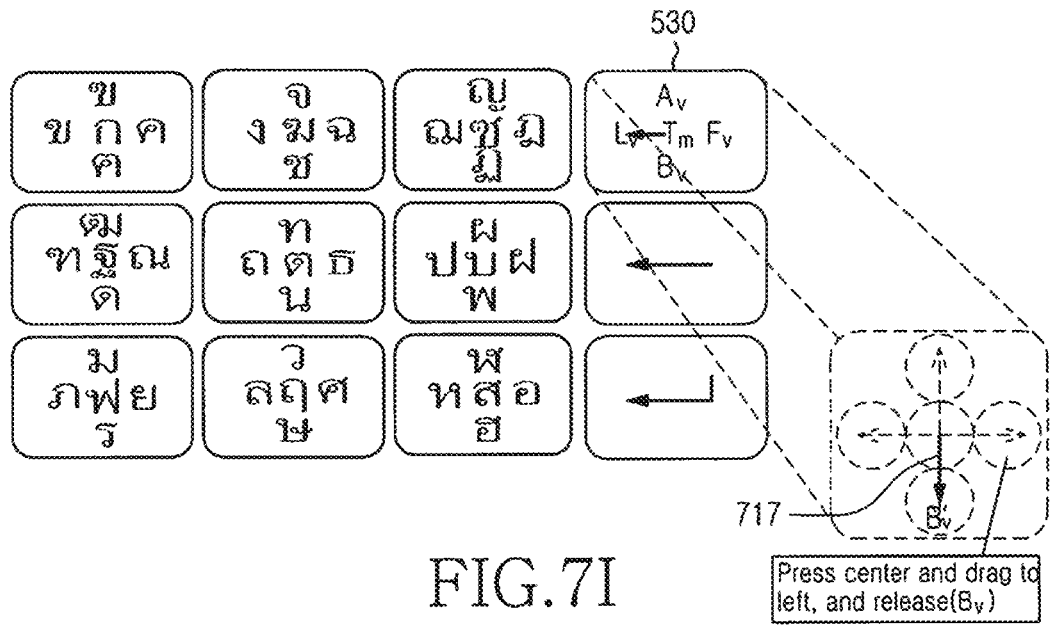
Figure 7J:

Referring to FIGS. 7I and 7J, in order to enter a letter of the Bv group using the second group key 530 of the first key set, the user presses the second group key 530, drags downward, and releases as indicated by reference numeral 717. Thus, a second key set 719 is displayed so that the user can enter the letter of the Bv group.

Figure 8A:
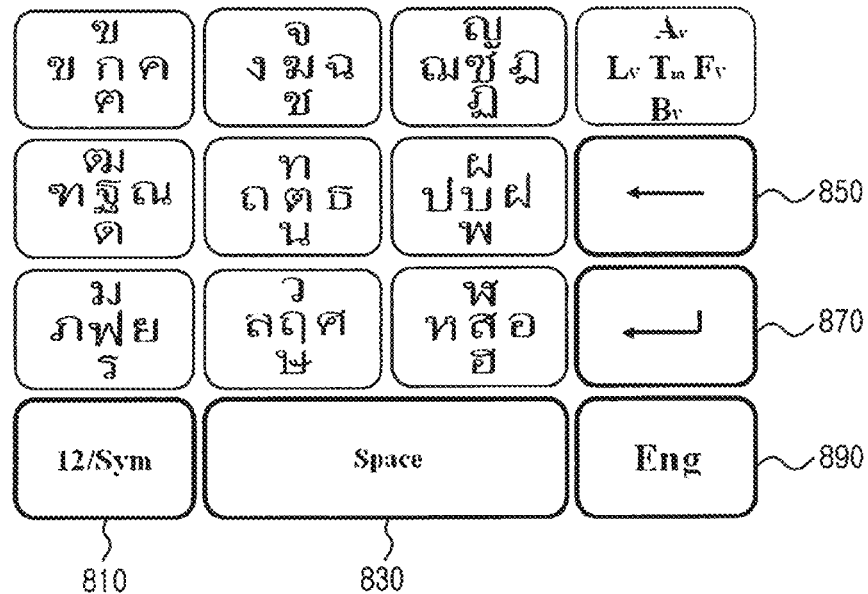
FIGS. 8A and 8B illustrate a touch screen having control keys for Thai character input according to an embodiment of the present invention.

Meanwhile, the first key set of the touch screen may include control keys according to an embodiment of the present invention, as illustrated in FIG. 8A.

Figure 8B:
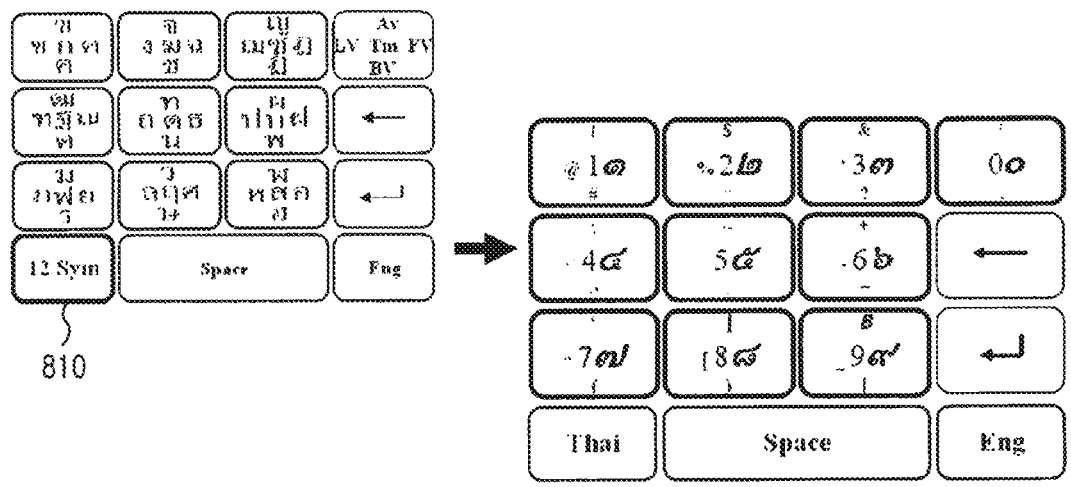

FIGS. 8A and 8B illustrate a touch screen having control keys for Thai character input according to an embodiment of the present invention.

Referring to FIG. 8A, the control keys include 12/sym key 810, a Space key 830, a Back Space key 850, an Enter key 870, and English (Eng) key 890 for inputting characters of the English alphabet.

The 12/symbol key 810 is used to enter digits or special characters. In order to select the 12/symbol key 810 to enter a digit or a special character, Arabic numerals/Thai numerals/special characters are displayed in the layout illustrated in FIG. 8B. If the user intends to enter a Thai numeral, the user presses a predetermined key, drags to the right, and releases in the same manner as for character input, as described hereinabove.

An apparatus and method for inputting Thai characters using the afore-described touch screen that facilitates Thai character entry will be described with reference to FIGS. 9 and 10.

Figure 9:
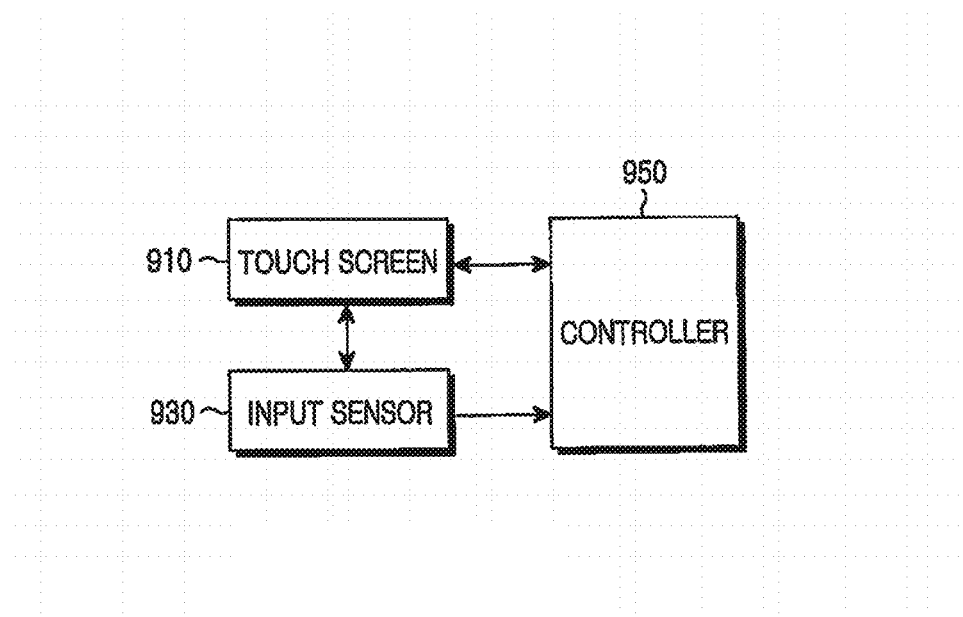
FIG. 9 is a block diagram of a Thai character input apparatus using a touch screen according to an embodiment of the present invention.

FIG. 9 is a block diagram of a Thai character input apparatus using a touch screen according to an embodiment of the present invention.

Referring to FIG. 9, the Thai character input apparatus includes a touch screen 910 having a touch screen keyboard area (not shown) and a display area (not shown), an input sensor 930, and a controller 950.

The touch screen 910 displays the first key set or both the first and second key sets under the control of the controller 950 and displays letters selected by the first and second key sets.

The input sensor 930 senses selection of a particular key on the touch screen 910 and notifies the controller 950 of the key input. For example, the input sensor 930 senses whether the key has been pressed and released, or pressed, dragged and released on the touch screen 910.

The controller 950 controls the first key set or both the first and second key sets to be displayed and controls letters input by the first and second key sets to be displayed on the touch screen 910.

Figure 10:
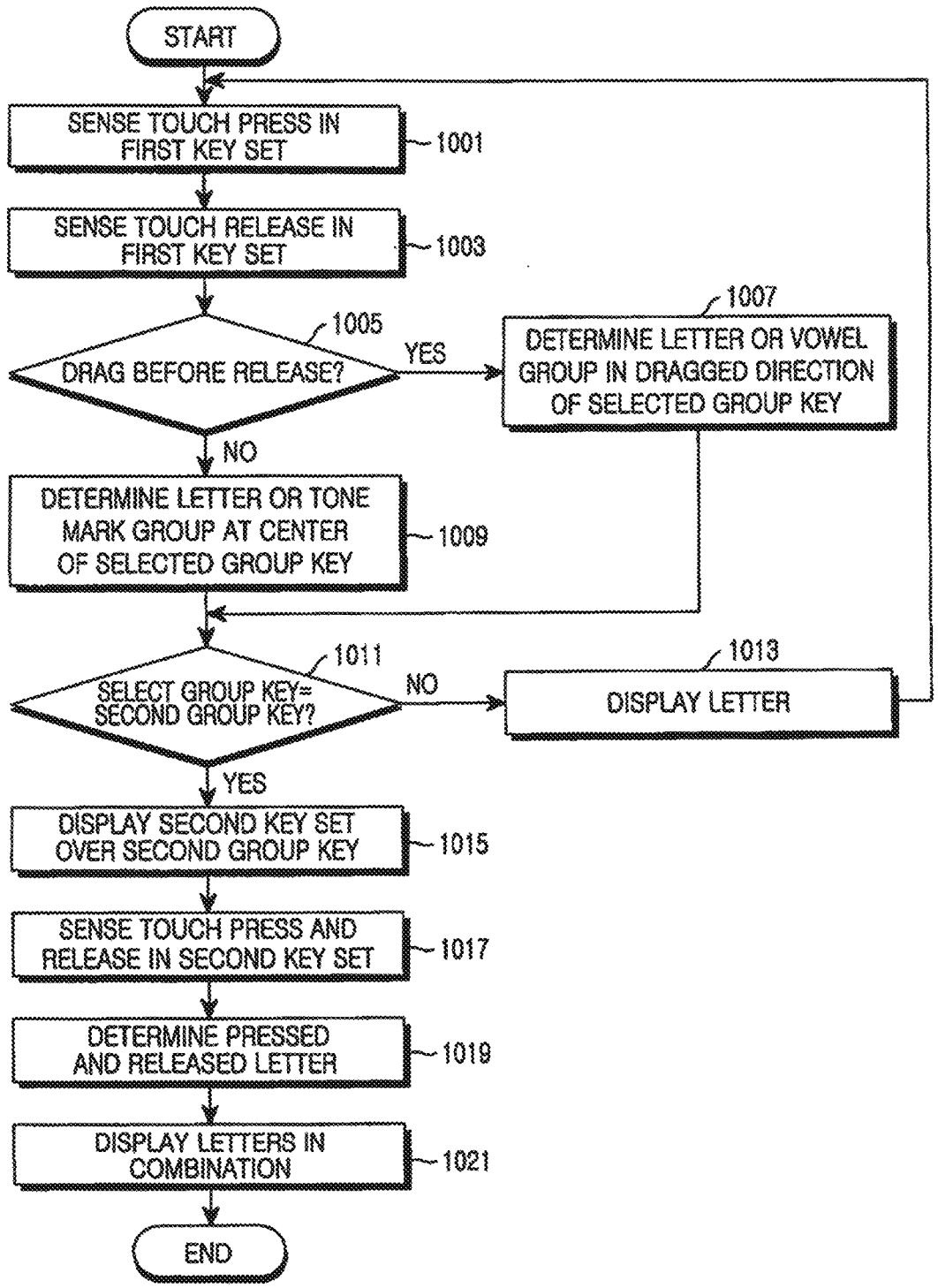
FIG. 10 is a flowchart illustrating a Thai character input method using a touch screen according to an embodiment of the present invention.

With reference to FIG. 10, a Thai character input method implemented by the controller 950 according to an embodiment of the present invention will be described.

FIG. 10 is a flowchart illustrating a Thai character input method using a touch screen according to an exemplary embodiment of the present invention.

Referring to FIG. 10, the controller 950 senses a press of the pointer over a particular group key of the first key set through the input sensor 930 in step 1001. In step 1003, the controller 950 senses a release of the pointer from the group key though the input sensor 930 and determines the released position.

The controller 950 determines whether the pointer has been dragged before the release, by comparing a pressed position with a released position in step 1005. If the pointer was dragged, the controller 950 determines a letter or a vowel group corresponding to the direction of the dragging among the letters mapped to the selected group key in step 1007. If the pointer was not dragged, the controller 950 determines a letter or a Tm group at the center of the group key in step 1009.

In step 1011, the controller 950 determines whether the selected group key is the second group key for entering vowels and Tms. If the selected group key is not the second group key, i.e., the selected group key is a first group key, the controller 950 displays the determined letter on the display area of the touch screen 910 and waits a touch press from the user in step 1013.

However, if the selected group key is the second group key, the controller 950 displays a second key set including the determined vowel or Tm group over the second group key in step 1015. The controller 950 senses a press and release of the second key set and determines the position of the touch press and release in step 1017 and determines a letter corresponding to the press and release position in step 1019. In step 1021, a combination of letters corresponding to the sequence of button presses and drags is displayed.

Figures 11A, 11B:
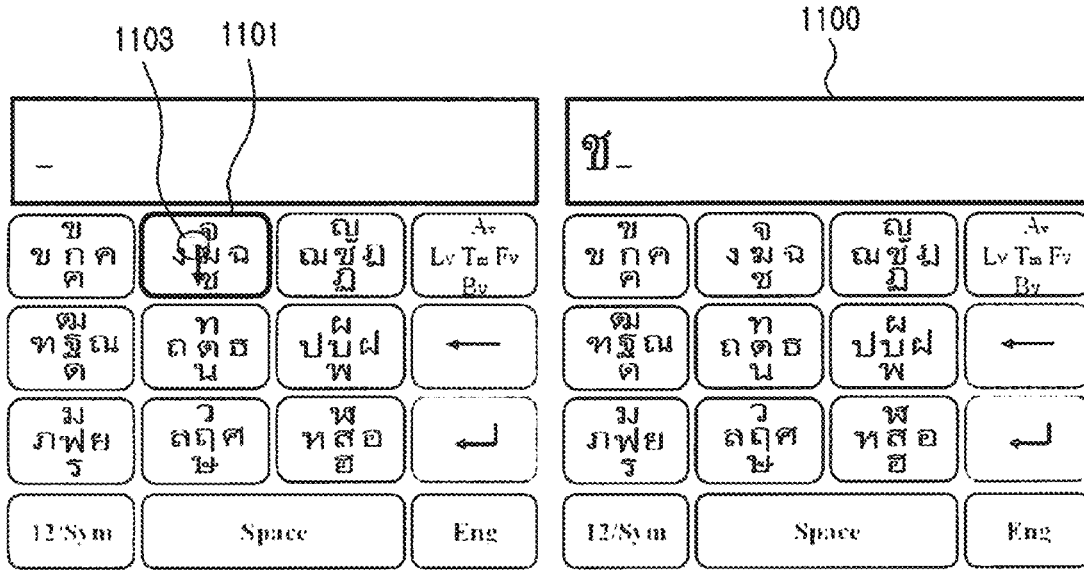
FIGS. 11A to 11L illustrate a character input in the Thai character input method according to an embodiment of the present invention.
Figures 11C, 11D:
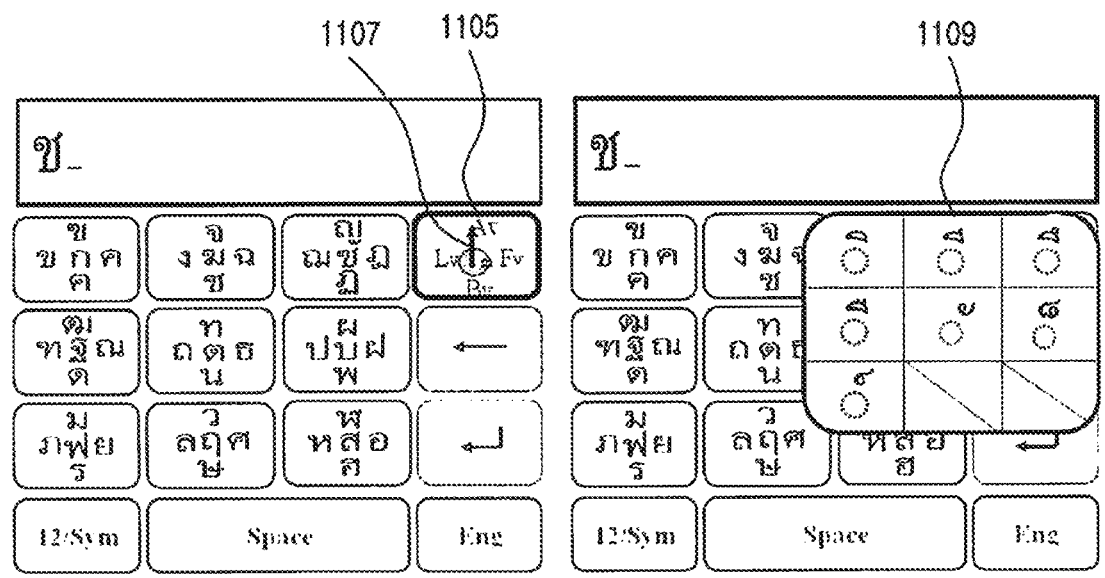

With reference to FIGS. 11A, 11B and 11C, the above-described Thai character input method will be described, with a specific example.

FIGS. 11A to 11L illustrate a character input in the Thai character input method according to an embodiment of the present invention.

A user's input of text with reference to FIGS. 11A to 11L is described as follows.

To enter the text, the user sequentially inputs first, second, and third letters, respectively, according to a Thai character writing order.

Referring to FIGS. 11A to 11D, in order to input the first letter, the user presses a first group key 1101 including, drags downward, and releases, as indicated by reference numeral 1103. Thus, is displayed in a display area 1100 in FIG. 11B.

Figure 11E:
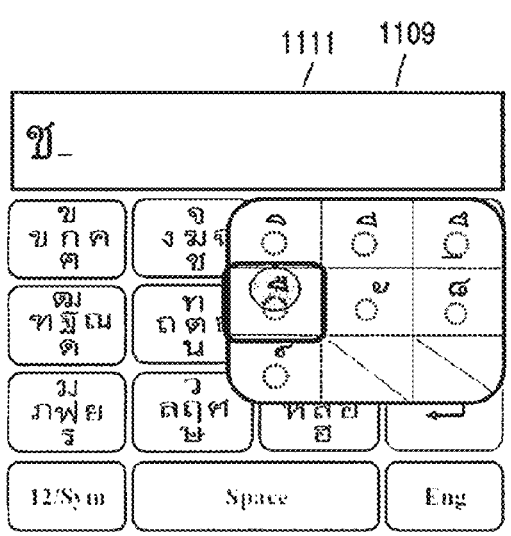
Figure 11F:
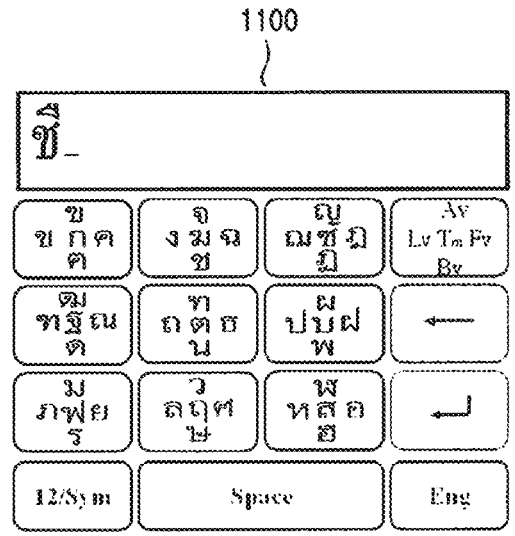
Figure 11G:
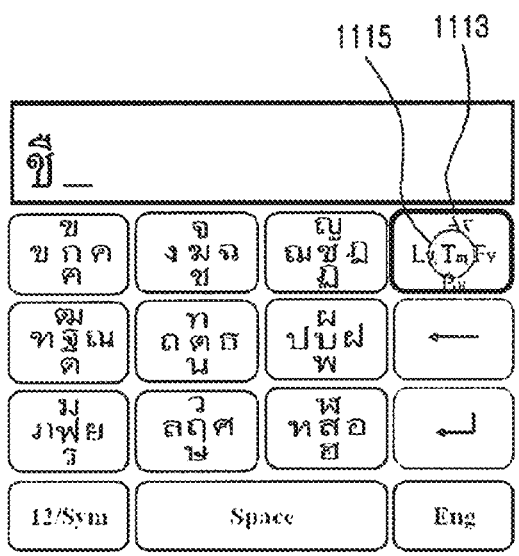
Figure 11H:
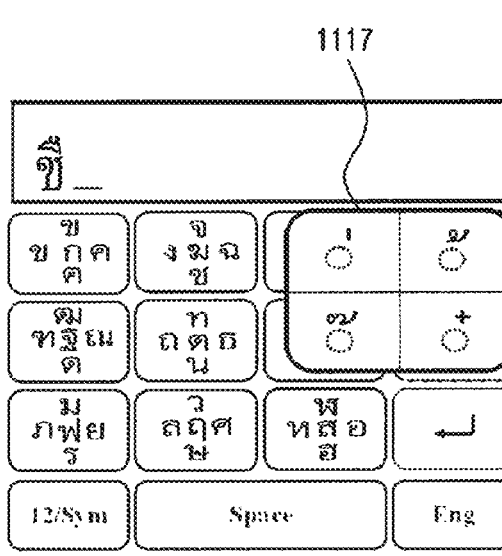

In order to input the second letter, the user presses a second group key 1105 including the Av group with, drags upward, and releases, as indicated by reference numeral 1107 in FIG. 11C. Then a second key set 1109 corresponding to the Av group with is displayed in FIG. 11D. Referring to FIG. 11E, a key 1111 of the second key set 1109 is pressed and released to enter. Thus, a combination of and is displayed in the form of in the display area 1100 in FIG. 11F.

Figures 11I, 11J:
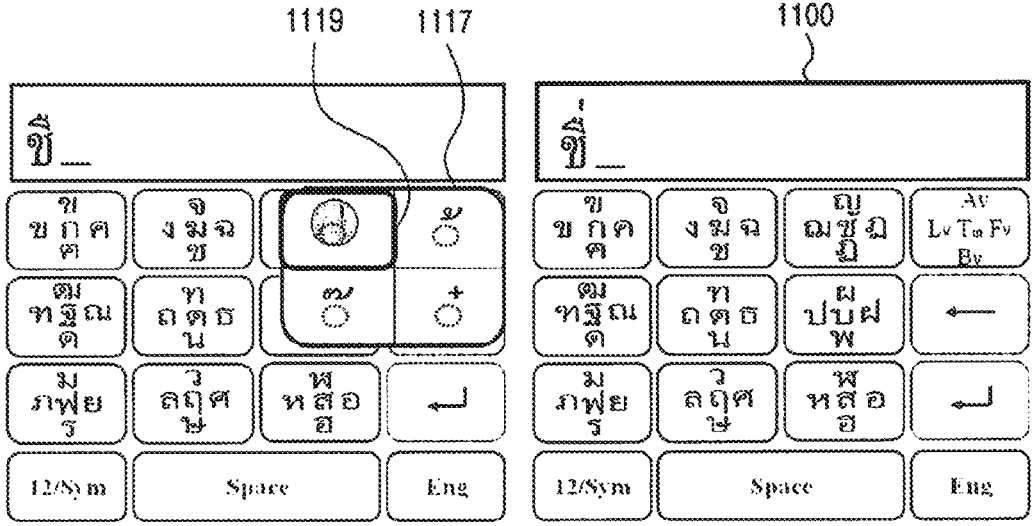
Figures 11K, 11L:
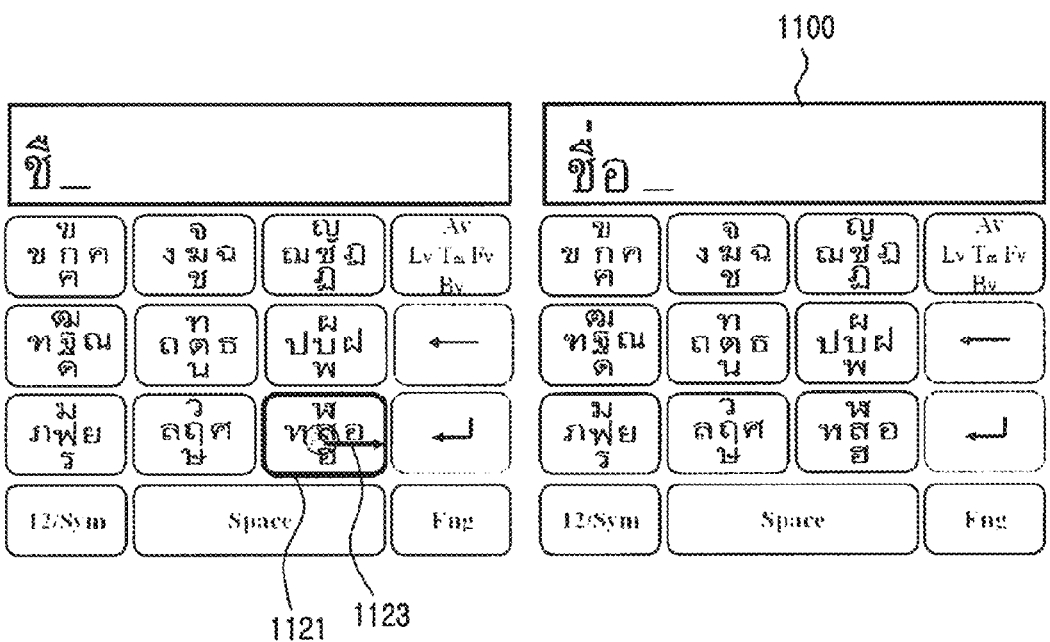

The user is then enters the letter. When the user presses and then releases a second group key corresponding to the Tm group with, as indicated by reference numeral 1115 in FIG. 11G, the Tm group is displayed as a second key set 1117 over the second group key 1113 in FIG. 11H. In FIG. 11I, the user presses and releases a key 1119 of the second key set 1113. Then the first, second and third letters, and, are combined to in the display area 1100 in FIG. 11J.

is the fourth letter to be input. Thus, the user presses a first group key 1121 including, drags to the right, and then releases as indicated by reference numeral 1123 in FIG. 11K, the first, second and third letters, and, are combined with and the resulting text is displayed in the display area 1100 in FIG. 11L.

As is apparent from the above description, the embodiments of the present invention allow users to input one combined syllable quickly and easily, with less than eight touches, through a touch screen that facilitates Thai character entry in a terminal.

Another advantage of the present invention is that the number of keys for entering Thai characters in a first key set of the touch screen can be minimized by use of a second key set in the terminal.

Since the number of keys for entering Thai characters is minimized, keys corresponding to Thai letters can be input on a small touch screen with a user's finger as well as a stylus pen.

A second key set is enlarged when displayed. Therefore, the user can enter a desired Thai character easily and fast.

The present invention also simplifies a Thai character entry input/pointing process, thereby shortening the time required for Thai character entry.

While the present invention has been shown and described with reference to certain embodiments of the present invention thereof, it will be understood by those skilled in the art that various changes in form and details may be made therein without departing from the spirit and scope of the present invention as defined by the appended claims and their equivalents.

What is claimed is:

1. A character input apparatus of a terminal, comprising:
   a touch screen for displaying a first key set including at least one first group key and a second group key, each of the at least one first group key having a plurality of predetermined first letters arranged in predetermined directions and the second group key having a plurality of symbols which correspond to a plurality of predetermined second letter groups and are arranged in predetermined directions; and
   a controller for, upon receipt of a touch input on the second group key, controlling display of a second key set including letter keys to which a plurality of second letters are allocated, which are included in a second letter group corresponding to a symbol positioned in a direction corresponding to the touch input.

2. The character input apparatus of claim 1, wherein upon selection of one of the letter keys of the second key set, the controller controls display of a second letter corresponding to the letter key selected on the touch screen.

3. The character input apparatus of claim 1, wherein upon receipt of a touch input on one of the at least one first group key, the controller selects a first letter positioned in a direction corresponding to the touch input and, upon selection of one of the letter keys of the second key set after the first letter is selected, the controller controls display of the first letter and a second letter corresponding to the selected letter key in combination on the touch screen.

4. The character input apparatus of claim 1, wherein each of the plurality of predetermined first letters is positioned in one of up, down, left, right, and center directions on each first group key and each of the plurality of symbols is positioned in one of up, down, left, right, and center directions on the second group key.

5. The character input apparatus of claim 1, wherein the plurality of first letters are consonants and the plurality of second letters are vowels.

6. The character input apparatus of claim 5, wherein the plurality of second letters further include Tone Marks (TMs).

7. A character input method of a terminal, comprising:
   displaying a first key set including at least one first group key and a second group key, each of the at least one first group key having a plurality of predetermined first letters arranged in predetermined directions and the second group key having a plurality of symbols which correspond to a plurality of predetermined second letter groups and are arranged in predetermined directions; and
   displaying, upon receipt of a touch input on the second group key, a second key set including letter keys to which a plurality of second letters are allocated, which are included in a second letter group corresponding to a symbol positioned in a direction corresponding to the touch input.

8. The character input method of claim 7, further comprising, displaying, upon selection of one of the letter keys of the second key set, a second letter corresponding to the selected letter key.

9. The character input method of claim 7, further comprising:
   selecting, upon receipt of a touch input on one of the at least one first group key, a first letter positioned in a direction corresponding to the touch input; and
   displaying, upon selection of one of the letter keys of the second key set after the first letter is selected, the first letter and a second letter corresponding to the selected letter key in combination.

10. The character input method of claim 7, wherein each of the plurality of predetermined first letters is positioned in one of up, down, left, right, and center directions on the first group key and each of the plurality of symbols is positioned in one of up, down, left, right, and center directions on the second group key.

11. The character input method of claim 7, wherein the plurality of first letters are consonants and the plurality of second letters are vowels.

12. The character input method of claim 11, wherein the plurality of second letters further include Tone Marks (TMs).

* * * * *